US012600375B2

(12) United States Patent
Tanaka

(10) Patent No.: US 12,600,375 B2
(45) Date of Patent: Apr. 14, 2026

(54) PARKING ASSISTANCE DEVICE AND PARKING ASSISTANCE PROGRAM

(71) Applicant: TOYOTA JIDOSHA KABUSHIKI KAISHA, Toyota (JP)

(72) Inventor: Hiroshi Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 18/626,692

(22) Filed: Apr. 4, 2024

(65) Prior Publication Data

US 2024/0336276 A1 Oct. 10, 2024

(30) Foreign Application Priority Data

Apr. 7, 2023 (JP) ................................. 2023-062929

(51) Int. Cl.

| | |
|---|---|
| *B60Q 1/00* | (2006.01) |
| *B60W 30/06* | (2006.01) |
| *B60W 30/16* | (2020.01) |
| *B60W 30/182* | (2020.01) |
| *B60W 50/00* | (2006.01) |
| *B60W 50/14* | (2020.01) |

(52) U.S. Cl.
CPC ............ *B60W 50/14* (2013.01); *B60W 30/06* (2013.01); *B60W 30/16* (2013.01); *B60W 30/182* (2013.01); *B60W 50/0097* (2013.01); *B60W 2050/143* (2013.01); *B60W 2050/146* (2013.01); *B60W 2554/80* (2020.02)

(58) Field of Classification Search
CPC ...... B60W 50/14; B60W 30/06; B60W 30/16;

B60W 30/182; B60W 50/0097; B60W 2050/143; B60W 2050/146; B60W 2554/80; B62D 15/0285

USPC .......................... 340/435, 436, 438, 439, 903
See application file for complete search history.

(56) References Cited

U.S. PATENT DOCUMENTS

| | | | |
|---|---|---|---|
| 9,522,661 B2 | 12/2016 | Inoue et al. | |
| 9,604,638 B2 | 3/2017 | Kiyokawa et al. | |
| 9,738,276 B2 | 8/2017 | Kiyokawa et al. | |
| 9,828,028 B2 | 11/2017 | Ishijima et al. | |
| 9,836,658 B2 | 12/2017 | Kiyokawa et al. | |
| 9,875,655 B2 | 1/2018 | Kiyokawa et al. | |
| 10,031,227 B2 | 7/2018 | Kiyokawa et al. | |
| 10,150,486 B2 | 12/2018 | Hoshino et al. | |
| 10,239,520 B2 | 3/2019 | Tomozawa et al. | |
| 10,377,416 B2 | 8/2019 | Fukukawa et al. | |
| 2017/0032680 A1* | 2/2017 | Imai ................... | G01C 21/3407 |
| 2017/0259850 A1* | 9/2017 | Yamashita ............... | B62D 6/00 |
| 2021/0070282 A1* | 3/2021 | Kim ...................... | B60W 30/06 |

(Continued)

FOREIGN PATENT DOCUMENTS

| | | |
|---|---|---|
| JP | 2020-152345 A | 9/2020 |
| JP | 2021-195054 A | 12/2021 |

*Primary Examiner* — Anh V La

(74) *Attorney, Agent, or Firm* — Finnegan, Henderson, Farabow, Garrett and Dunner LLP

(57) ABSTRACT

A parking assistance device, comprising: a prediction unit for predicting whether or not a distance to an obstacle around the vehicle becomes less than or equal to a reference distance while the vehicle is automatically parked; and a notification unit for performing a notification indicating that a distance to the obstacle may be close during parking to an occupant, when the distance to the obstacle is predicted to be equal to or less than the reference distance.

4 Claims, 5 Drawing Sheets

(56)     References Cited

U.S. PATENT DOCUMENTS

2021/0107563 A1*  4/2021  Minase ................. G08G 1/147
2022/0001857 A1   1/2022  Hamada

* cited by examiner

PARKING ASSISTANCE DEVICE AND PARKING ASSISTANCE PROGRAM

FIELD

The present disclosure relates to a parking assistance device and a parking assistance program.

BACKGROUND

Conventionally, there has been known a parking assistance device in which an automatic parking parameter for a narrow space is selected when a distance between a parking route and a peripheral obstacle is shorter than a predetermined threshold when performing automatic parking control for automatically parking the vehicle (JP2020-152345A). In particular, in JP2020-152345A, when the distance between the parking route and the surrounding obstacle is less than a predetermined threshold, the value of the stop determination distance parameter, which is automatically stopped by the auto-braking when the presence of the obstacle is detected, is changed to a smaller value than when the distance exceeds the threshold.

SUMMARY

As described above, when the automatic parking parameter for the minimum space is selected, the driver may feel anxious because the vehicle approaches the surrounding obstacle during parking.

In view of the above problems, an object of the present disclosure is to prevent a driver from feeling anxiety when performing automatic parking.

The gist of the present disclosure is as follows.

(1) A parking assistance device, comprising:
    a prediction unit for predicting whether or not a distance to an obstacle around the vehicle becomes less than or equal to a reference distance while the vehicle is automatically parked; and
    a notification unit for performing a notification indicating that a distance to the obstacle may be close during parking to an occupant, when the distance to the obstacle is predicted to be equal to or less than the reference distance.

(2) The parking assistance device according to above (1), wherein the prediction unit predicts that, when an in-between clearance in a target parking space is equal to or less than a predetermined reference clearance, the distance to an obstacle around the vehicle becomes equal to or less than the reference distance while the vehicle is automatically parked.

(3) The parking assistance device according to above (1), further comprising an automatic parking unit for automatically driving the vehicle until reaching the target parking mode, wherein
    the automatic parking unit automatically drives the vehicle until reaching the target parking mode by any of a narrow mode in which the distance to the obstacle around the vehicle when the vehicle is automatically parked becomes equal to or less than a reference distance, and a normal mode in which the distance to the obstacle around the vehicle when the vehicle is automatically parked is not less than the reference distance,
    the prediction unit, when the operation is performed in the narrow mode, predicts that the distance to the obstacle around the vehicle while the vehicle is automatically parked is less than or equal to the reference distance,
    the notification indicating that the distance from the obstacle may be close during parking is a notification indicating that the vehicle is parked in a narrow mode.

(4) The parking assistance device according to above (3), wherein the automatic parking unit automatically drives the vehicle in the narrow mode until the vehicle reaches the target parking mode when an in-between clearance in the target parking space is equal to or less than a predetermined reference clearance, and automatically drives the vehicle in the normal mode until the vehicle reaches the target parking mode when the in-between clearance is larger than the reference clearance.

(5) A parking assistance program, causing a processor to execute:
    predict whether a distance to an obstacle around the vehicle will be less than or equal to a reference distance while the vehicle is automatically parked; and
    when it is predicted that the distance to the obstacle is equal to or smaller than the reference distance, perform a notification indicating that the distance to the obstacle may be close during parking to an occupant.

DESCRIPTION OF EMBODIMENTS

Figure 1:
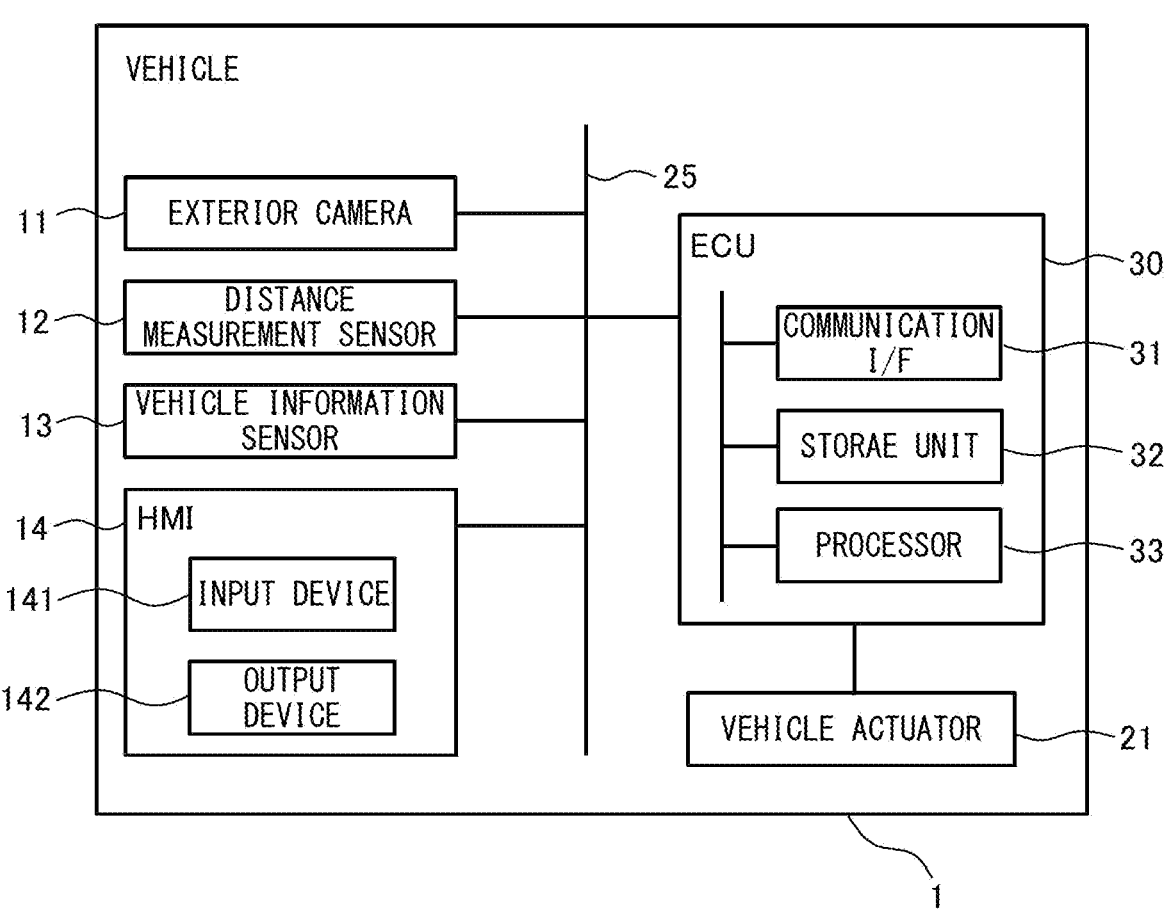
FIG. 1 is a configuration diagram schematically illustrating a vehicle on which a parking assistance device according to an embodiment is mounted.

Hereinafter, embodiments will be described in detail with reference to the drawings. In the following description, the same reference numerals are given to similar components.

First Embodiment

<Configuration of Vehicle>
FIG. 1 is a configuration diagram schematically illustrating a vehicle 1 on which a parking assistance device according to a first embodiment is mounted. The parking assistance device performs automatic driving of the vehicle 1 so that the vehicle 1 is automatically parked in the target parking space. In the present embodiment, the vehicle 1 includes an exterior camera 11, a ranging sensor 12, a vehicle information sensor 13, a human machine interface (hereinafter, referred to as "HMI") 14, a vehicle actuator 21, and an electronic control unit (hereinafter, referred to as "ECU") 30.

However, the vehicle 1 does not necessarily have to have all of them. For example, the vehicle 1 may not include the ranging sensor 12 as long as it includes the exterior camera 11.

The exterior camera 11, the ranging sensor 12, the vehicle information sensor 13, the HMI 14, and the ECU 30 are communicably connected via the in-vehicle network 25. The in-vehicle network 25 is a network conforming to a standard such as CAN (Controller Area Network). Further, the ECU 30 is connected to the vehicle actuator 21 via a signaling line.

The exterior camera 11 is a device that captures an image of the surroundings of the vehicle. The exterior camera 11 includes a two-dimensional detector (such as a CCD, C-MOS) configured by arrays of photoelectric transducers sensitive to visible light, and an imaging optical system that forms an image of an area to be captured on the two-dimensional detector. In the present embodiment, the vehicle 1 includes a plurality of exterior cameras 11. Two exterior cameras 11 are mounted, for example, in the vehicle 1, toward the front and the rear of the vehicle 1 so as to respectively capture the front and the rear of the vehicle 1. The other two exterior cameras 11 are attached to the outside of the vehicle 1 (for example, a side mirror) toward the left side and the right side of the vehicle 1 so as to respectively capture the left side and the right side of the vehicle 1. Note that the exterior camera 11 may be a monocular camera or a stereo camera. When a stereo camera is used as the exterior camera 11, the exterior camera 11 also functions as the ranging sensor 12.

The ranging sensor 12 is a sensor that measures a distance to an object existing around the vehicle 1. In the present embodiment, the ranging sensor 12 can also measure the azimuth of an object existing around the vehicle 1. The ranging sensor 12 is, for example, a radar such as a milli-meter-wave radar, a LiDAR, or a sonar. In the present embodiment, the ranging sensor 12 measures a distance to an object existing on four sides of the vehicle. The ranging sensor 12 outputs the measured distance to the surrounding object to the ECU 30 at predetermined intervals via the in-vehicle network 25.

The vehicle information sensor 13 is a sensor that acquires information related to the vehicle 1. The vehicle information sensor 13 includes a traveling state sensor that detects a traveling state of the vehicle 1 and a positioning sensor that measures a self position of the vehicle 1. The traveling state sensor detects, for example, a speed of the vehicle 1, an acceleration of the vehicle 1, a change speed of a yaw angle (yaw rate) at the time of turning of the vehicle 1, and the like. The positioning sensor is, for example, a GNSS (Global Navigation Satellite System) receiver. The GNSS receiver receives a signal with time information from a plurality of positioning satellites, and measures a self-position of the vehicle 1 based on the received signal. The vehicle information sensor 13 outputs information related to the vehicle 1 to the ECU 30 via the in-vehicle network 25.

The HMI 14 is a user interface for exchanging data between the ECU 30 of the vehicle and the occupant of the vehicle 1. The HMI 14 includes an input device 141 that receives an input from an occupant of the vehicle 1, and an output device 142 that notifies the occupant of the vehicle 1. The input device 141 is a device that accepts a physical operation or a voice operation by an occupant as an input, and includes, for example, any one of a touch panel, a switch, a button, a microphone, and the like. On the other hand, the output device 142 is a device that notifies an occupant through five senses (e.g., visual, auditory, tactile, etc.) of the occupant, and includes, for example, any one of a display device (e.g., a liquid crystal display, a head-up display, etc.), a lighting device such as a warning light, a speaker, a vibration unit, etc.

The HMI 14 transmits the input received from the occu-pant via the input device 141 to the ECU 30 via the in-vehicle network 25. Further, the HMI 14 notifies, via the output device 142, the occupant of the notification informa-tion corresponding to the signal received from the ECU 30 via the in-vehicle network 25. Specifically, the HMI 14 causes the display device to display the information for notification and outputs the audio information for notifica-tion from the speaker.

In the present embodiment, the HMI 14 is mounted on the vehicle 1 in advance. However, a terminal (for example, a smart phone, a tablet, a personal computer, or the like) owned by an occupant of the vehicle 1 may be used as the HMI 14 by connecting the terminal to the ECU 30 by wire or wirelessly.

The vehicle actuator 21 is an actuator used to control the operation of the vehicle 1. Specifically, the vehicle actuator 21 includes, for example, a drive actuator for controlling an internal combustion engine or an electric motor for driving the vehicle 1, a braking actuator for controlling a brake for braking the vehicle 1, and a steering actuator for controlling steering of the vehicle 1. The vehicle actuator 21 controls acceleration, braking, and steering of the vehicle 1 in accordance with a control signal transmitted from the ECU 30 via a signal line.

The ECU 30 functions as a parking assistance device that assists parking of the vehicle 1. In the present embodiment, the ECU 30 assists setting of a target parking mode such as a target parking space and a direction of parking in the target parking space, and controls the vehicle actuator 21 to automatically drive the vehicle 1 so that the vehicle 1 is parked in the set target parking mode. The ECU 30 may be composed of a plurality of the ECU 30 divided for each function. The ECU 30 includes a communication interface 31, a storage unit 32, and a processor 33. Note that the communication interface 31, the storage unit 32, and the processor 33 may be separate circuits or may be configured as one integrated circuit.

The communication interface 31 includes a communica-tion interface circuit and a device interface circuit. The communication interface circuit is a circuit for connecting the ECU 30 to the in-vehicle network 25. The device interface circuit is a circuit for outputting a control signal to the vehicle actuator 21. The communication interface 31 transmits signals received from the exterior camera 11, the ranging sensor 12, the vehicle information sensor 13, and the inputting device 141 of the HMI 14 to the processor 33. Further, the communication interface 31 transmits the signal output from the processor 33 to the output device 142 of the HMI 14 and the vehicle actuator 21.

The storage unit 32 stores data. The storage unit 32 includes, for example, at least one of a volatile semicon-ductor memory, a nonvolatile semiconductor memory, a hard disk drive (HDD), and a solid state drive (SSD). The storage unit 32 stores a program to be executed by the processor 33 of the ECU 30. The storage unit 32 also stores data transmitted from the exterior camera 11 and the like.

The processor 33 comprises one or more CPU (Central Processing Unit) and its peripheral circuit. The processor 33 may further include other arithmetic circuits such as a logical arithmetic unit or a numerical arithmetic unit. The processor 33 executes a program stored in the storage unit 32.

In the present embodiment, the processor 33 performs automatic parking on the basis of information about the vehicle 1, such as an image captured by the exterior camera 11 and a distance to a surrounding object detected by the ranging sensor 12, and information input by an occupant via the input device 141 of the HMI 14. In particular, in the present embodiment, the processor 33 sets the target parking mode (the target parking space, the direction of parking in the target parking space, and the like) when parking the vehicle 1 based on the information about the periphery of the vehicle 1 and the input information of the occupant. In addition, the processor 33 creates a driving plan for parking the vehicle 1 in the target parking mode, and causes the vehicle actuator 21 to perform driving operations related to accelerate, braking, and steering in accordance with the created driving plan. Further, the processor 33 transmits a signal corresponding to the information for notification to the output device 142 of the HMI 14 as needed, and performs various notifications to the occupant of the vehicle 1 via the output device 142.

Figure 2:
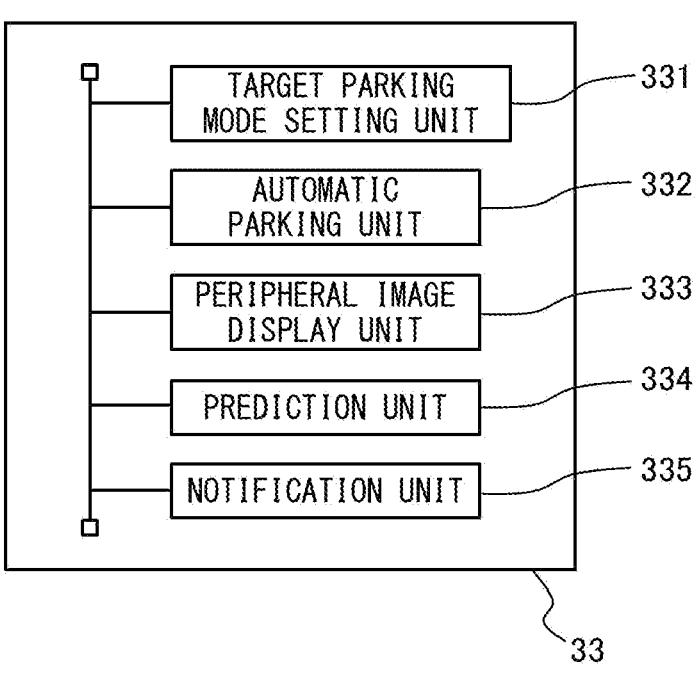
FIG. 2 is a functional diagram of a processor of an ECU.

FIG. 2 is a functional diagram of the processor 33 of the ECU 30. As illustrated in FIG. 2, the processor 33 includes a target parking mode setting unit 331, an automatic parking unit 332, a peripheral image display unit 333, a prediction unit 334, and a notification unit 335. The target parking mode setting unit 331 sets the target parking mode based on information input by the occupant via the input device 141. The automatic parking unit 332 controls the vehicle actuator 21 to automatically drive the vehicle 1 until the vehicle reaches the target parking mode. The peripheral image display unit 333 causes the display device of the output device 142 to display an image of the periphery of the vehicle 1 captured by the exterior camera 11 while the vehicle 1 is parked. The prediction unit 334 predicts whether or not the distance to the obstacle around the vehicle 1 becomes equal to or less than the reference distance while the vehicle 1 is automatically parked. In particular, in the present embodiment, the prediction unit 334 predicts whether or not the distance to the obstacle around the vehicle 1 becomes equal to or less than the reference distance while the vehicle 1 is automatically parked, based on whether or not the in-between clearance in the target parking space is equal to or less than the predetermined reference clearance. When it is predicted that the distance to the obstacle around the vehicle 1 becomes equal to or smaller than the reference distance while the vehicle 1 is automatically parked, the notification unit 335 notifies the occupant that the distance to the obstacle may be close during parking. These units included in the processor 33 are, for example, functional modules realized by a computer program running on the processor 33. Alternatively, each unit included in the processor 33 may be a dedicated arithmetic circuit provided in the processor 33.

<Flow of Automatic Parking>

Figure 3:
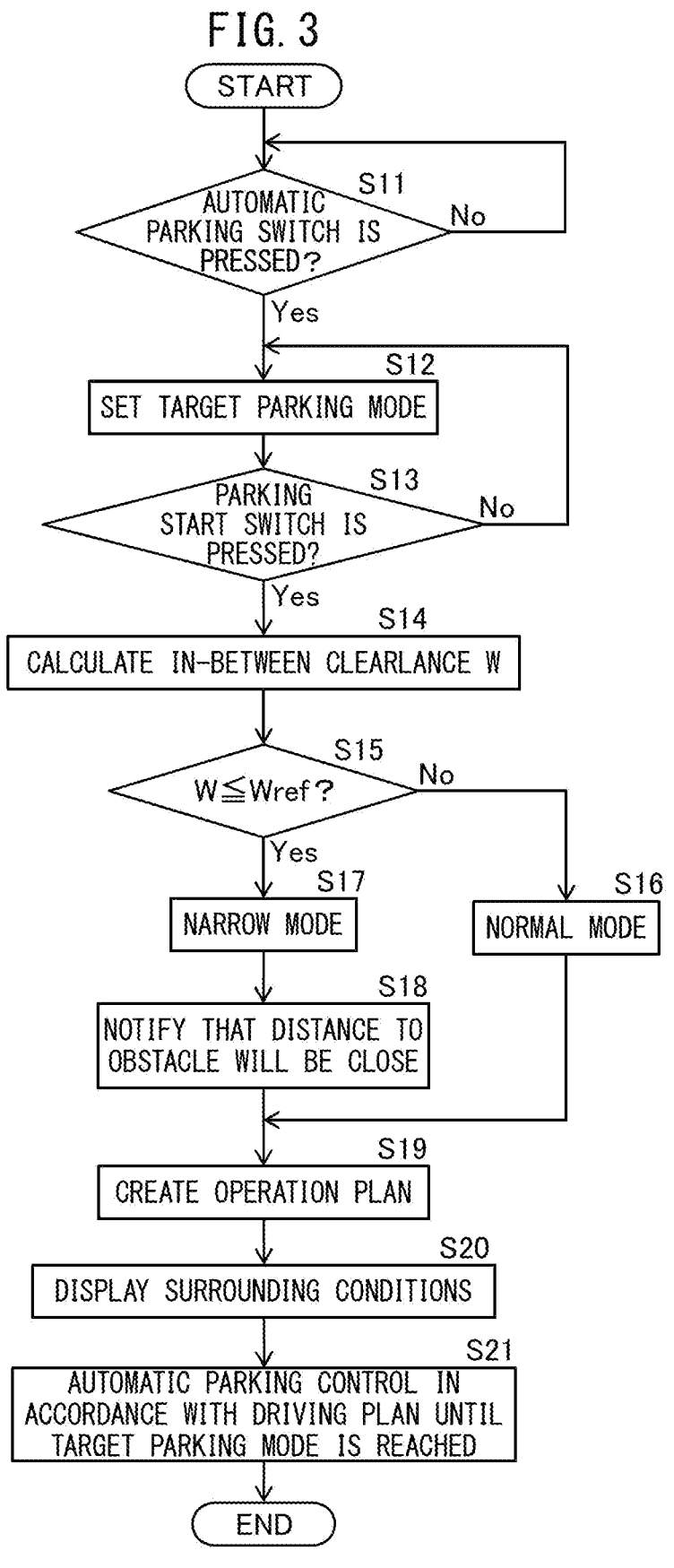
FIG. 3 is a flowchart schematically illustrating a flow of an automatic parking process performed by the parking assistance device.

Next, the flow of the automatic parking process by the parking assistance device will be described with reference to FIG. 3. FIG. 3 is a flowchart schematically illustrating a flow of an automatic parking process performed by the parking assistance device. The illustrated automatic parking process is executed by the processor 33 of the ECU 30.

As illustrated in FIG. 3, in the automatic parking process, first, the target parking mode setting unit 331 of the processor 33 determines whether the automatic parking switch is pressed by the occupant (step S11). The automatic parking switch is included in the input device 141. The automatic parking switch may be a switch provided in a display device such as a display having a touch panel, or may be a physical switch or a button. The target parking mode setting unit 331 determines whether or not the automatic parking switch is pressed, based on a signal input from the input device 141 via the in-vehicle network 25. If it is determined in step S11 that the automatic parking switch has not been pressed, step S11 is repeated.

When it is determined in step S11 that the automatic parking switch has been pressed, the target parking mode setting unit 331 sets the target parking mode (step S12). Specifically, the target parking mode setting unit 331 displays an image of the surroundings of the vehicle 1 on the display device of the output device 142 based on the image captured by the exterior camera 11, and displays a candidate parking space in which the vehicle 1 should be parked, superimposed on the image. When there are a plurality of candidates for the parking space, one candidate is selected as the target parking space from the plurality of candidates by the occupant. Such selection is input by, for example, a touch panel of the input device 141 and transmitted to the ECU 30. In addition, the target parking mode setting unit 331 displays a candidate of the direction of the vehicle 1 when parking in the parking space, superimposed on the surrounding image of the vehicle 1. When there are a plurality of candidates for the direction of the vehicle 1, one candidate is selected as the target parking direction from the plurality of candidates by the occupant as in the case where there are a plurality of candidates for the parking space. Therefore, in the present embodiment, as the setting of the target parking mode, the selection of the target parking space and the selection of the direction of the vehicle 1 when parking are performed are performed. However, as the setting of the target parking mode, other parameters related to the parking mode (for example, the position of the vehicle 1 in the parking space or the like) may be set.

When the target parking space is selected, the direction of the vehicle 1 is selected and the target parking mode is set in step S12, the target parking mode setting unit 331 determines whether or not the parking start switch is pressed by the occupant (step S13). The parking start switch is included in the input device 141. The parking start switch may be a switch provided in a display device such as a display having a touch panel, or may be a physical switch or a button. The target parking mode setting unit 331 determines whether or not the parking start switch is pressed, based on a signal input from the input device 141 via the in-vehicle network 25. If it is determined in step S13 that the parking start switch has not been pressed, steps S12 and S13 are repeated.

When it is determined that the parking start switch is pressed in step S13, the prediction unit 334 calculates the in-between clearance W at the target parking space based on the images captured by the exterior cameras 11. With reference to FIGS. 4A-4D, the in-between clearance W will be described.

FIGS. 4A-4D are diagrams schematically illustrating relationships between a parking mode of the other vehicles (obstacles) M and N around the target parking space X and an in-between clearance W. In particular, FIGS. 4A-4D will be described by taking a case where parallel parking is performed as an example. As shown in FIGS. 4A-4D, in the present embodiment, the in-between clearance W basically represents a clearance in a direction perpendicular to the front surface and the rear surface of the other vehicles around the target parking space X.

Figures 4A, 4B, 4C, 4D:
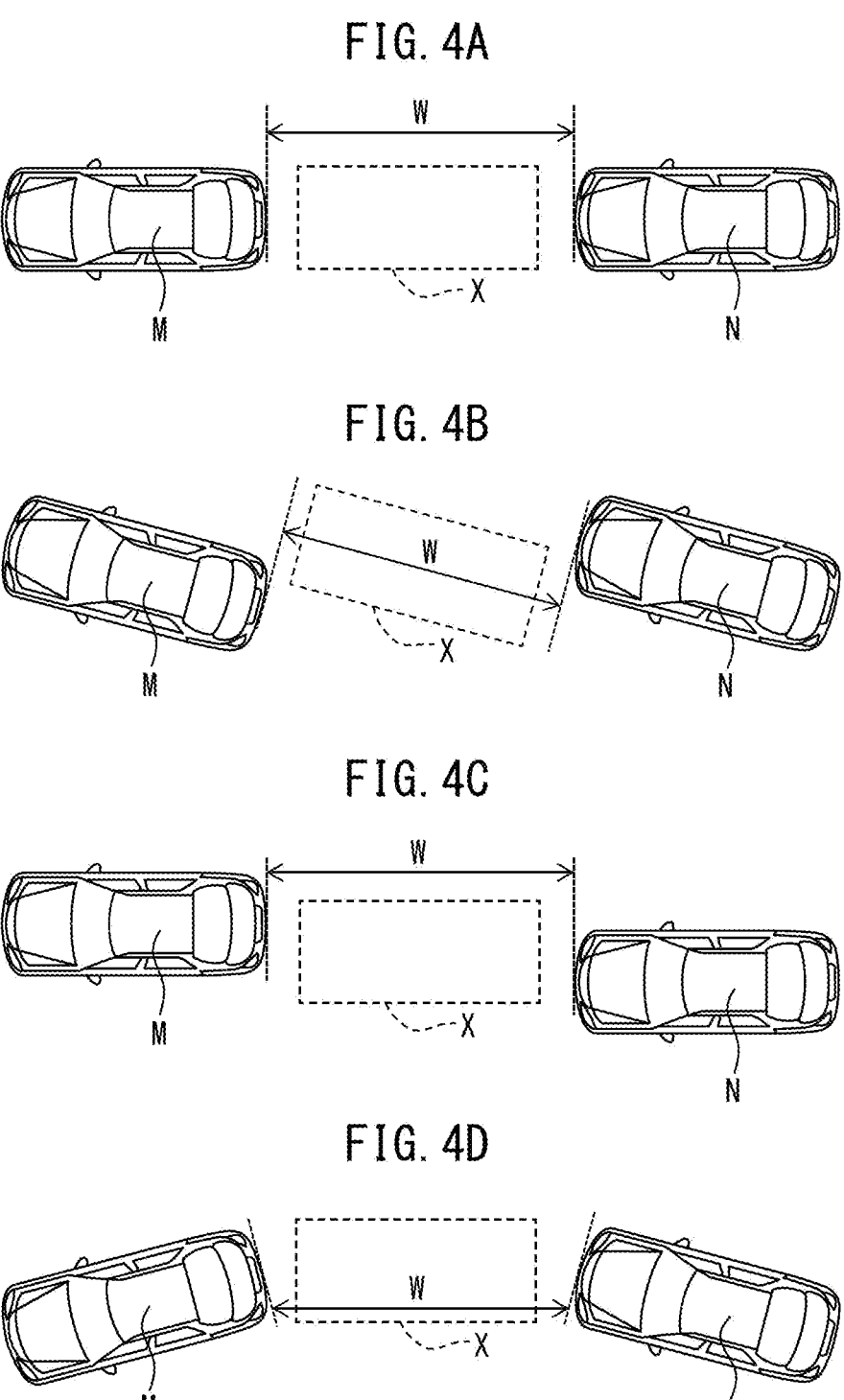
FIGS. 4A-4D are diagrams schematically illustrating relationships between a parking mode of another vehicle (obstacle) around a target parking space and an in-between clearance.

As illustrated in FIG. 4A, when the other vehicles M and N are located on the same straight line, the distance between the rear surface of the other vehicle M and the front surface of the other vehicle N is defined as the in-between clearance W. On the other hand, as shown in FIGS. 4B and 4C, when the other vehicles M and N are positioned in a parallel orientation while being offset to the left and right, the distance between the rear surface of the other vehicle M and the front surface of the other vehicle N in a direction perpendicular to the rear surface and the front surface is defined as the in-between clearance W. Further, as shown in FIG. 4D, when the other vehicles M and N around the target parking space X are not positioned in a parallel orientation, the minimum interval in the average direction between the rear surface of the other vehicle M and the front surface of the other vehicle N is defined as the in-between clearance W.

When the in-between clearance W is calculated in step S14 of FIG. 3, the prediction unit 334 determines whether or not the calculated in-between clearance W is equal to or less than a predetermined reference clearance Wref (step S15). Here, when the in-between clearance W is large, the distance to the other vehicle is maintained at a relatively long distance while the vehicle 1 is automatically parked. On the other hand, when the in-between clearance W is small, the distance to another vehicle is temporarily shortened while the vehicle 1 is automatically parked. Therefore, it can be said that the prediction unit 334 predicts whether or not the distance to the obstacle around the vehicle 1 becomes equal to or less than the reference distance while the vehicle 1 is automatically parked.

The reference clearance Wref corresponds to a distance such that the smallest distance to an obstacle around the vehicle 1 becomes the reference distance while the vehicle 1 is automatically parked. Therefore, the reference clearance Wref varies depending on, for example, the target parking mode. For example, when performing parallel parking, the reference clearance Wref is set to be larger than when performing perpendicular parking.

When it is determined in step S15 that the in-between clearance W is larger than the reference clearance Wref, the automatic parking unit 332 sets the parking mode in parking the vehicle 1 to the normal mode in which the distance to the obstacle around the vehicle 1 is not equal to or smaller than the reference distance (step S16). In the normal mode, for example, when the distance from the vehicle 1 to an obstacle around the vehicle 1 becomes equal to or smaller than the reference distance, the brake is automatically activated to prevent collision.

On the other hand, when it is determined in step S15 that the in-between clearance W is equal to or smaller than the reference clearance Wref, the automatic parking unit 332 sets the parking mode in parking the vehicle 1 to the narrow mode in which the distance to the obstacle around the vehicle 1 can be equal to or smaller than the reference distance (step S17). In the narrow mode, for example, even if the distance from the vehicle 1 to an obstacle around the vehicle 1 becomes equal to or less than the reference distance, the automatic brake for collision prevention is not activated, and the automatic brake is activated when the distance becomes equal to or less than a predetermined distance shorter than the reference distance.

Then, the notification unit 335 causes the output device 142 to notify the occupant that the distance to the obstacle may be close during parking (step S18). For example, the notification unit 335 causes the display device to display a display indicating that the distance to the obstacle may be close during parking, or causes the speaker to output a sound indicating that the distance to the obstacle may be close during parking. Specifically, the notification unit 335 notifies the occupant that the vehicle is automatically parked in the narrow mode by display or voice, for example. Therefore, in the present embodiment, the notification unit 335 notifies the occupant that the distance from the obstacle may be close during parking when it is determined that the in-between clearance W is equal to or less than the reference clearance Wref, that is, when it is determined that the distance to the obstacle around the vehicle 1 becomes equal to or less than the reference distance while the vehicle 1 is automatically parked.

When it is set that parking is performed in either the narrow mode or the normal mode in step S16 or S17, the automatic parking unit 332 creates a driving plan until the target parking mode is reached (step S19). The driving plan includes a target driving path until the vehicle 1 reaches the target parking mode, and a target speed of the vehicle 1 at each point of the target driving path.

When the parking mode is set to the normal mode in step S16, the automatic parking unit 332 creates an operation plan so that the distance between the vehicle 1 and the surrounding obstacle does not become equal to or smaller than the reference distance during parking. On the other hand, when the parking mode is set to the narrow mode in step S17, the automatic parking unit 332 creates an operation plan such that the distance between the vehicle 1 and the surrounding obstacle may be equal to or less than the reference distance during parking, but not equal to or less than the predetermined distance shorter than the reference distance.

Next, the peripheral image display unit 333 causes the display device of the output device 142 to display an image of the surroundings of the vehicle 1 captured by the exterior camera 11 (step S20). In the present embodiment, the image of the surroundings of the vehicle 1 is started to be displayed on the display device after the generation of the driving plan. However, the image of the surroundings of the vehicle 1 may be started to be displayed on the display device from any timing as long as it is determined that the parking start switch is pressed in step S13.

When the driving plan is created in step S19, the automatic parking unit 332 automatically drives the vehicle 1 according to the created driving plan until the target parking mode is reached based on the output of the vehicle information sensor 13 (step S21). Specifically, the automatic parking unit 332 controls the vehicle actuator 21 so that the vehicle 1 is driven in accordance with the created driving plan. Thus, the vehicle 1 is automatically driven until the target parking mode is reached.

Effect

According to the above-described embodiment, when the automatic parking is performed in the narrow mode, the distance between the vehicle 1 and the obstacle is shortened during parking. Therefore, if the occupant does not know that the automatic parking is performed in the narrow mode, the occupant may feel anxious. In particular, in the present embodiment, while the automatic parking is being performed, the image around the vehicle 1 is displayed on the display device by the peripheral image display unit 333, so that the occupant is likely to feel anxiety.

In this regard, in the above-described embodiment, when the automatic parking is performed in the narrow mode, that is, when it is predicted that the distance to the obstacle becomes equal to or less than the reference distance during parking, a notification indicating that the distance to the obstacle may be close during parking is performed for the occupant. This prevents the occupant from feeling anxiety when the distance between the vehicle 1 and the obstacle becomes short during parking.

Second Embodiment

Next, a parking assistance device according to a second embodiment will be described with reference to FIG. 5. The configuration and control of the parking assistance device according to the second embodiment are basically the same as the configuration and control of the parking assistance device according to the first embodiment. Hereinafter, portions different from the parking assistance device according to the first embodiment will be mainly described.

In the above described first embodiment, it is determined which parking mode among the narrow mode and the normal mode is to be used for parking based on the in-between clearance in the target parking space, and automatic parking by the automatic parking unit 332 is performed according to the determined parking mode. Then, when automatic parking is performed in the narrow mode, notification to the occupant is performed. On the other hand, in the second embodiment, after the driving plan is generated, when the automatic parking is performed in accordance with the driving plan, when it is expected that the smallest distance D between the vehicle 1 and the obstacle becomes equal to or smaller than the reference distance Dref, the notification to the occupant is performed.

Figure 5:
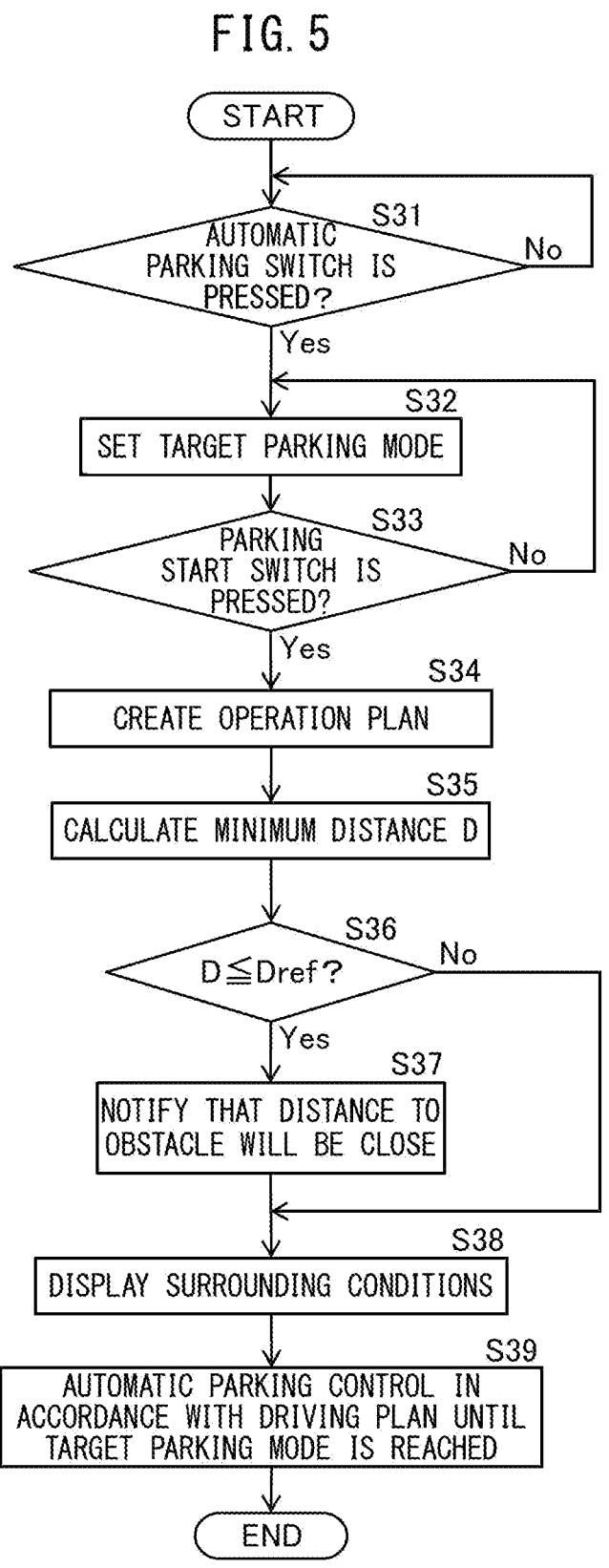
FIG. 5 is a flowchart, similar to FIG. 3, schematically illustrating the flow of the automatic parking process performed by a parking assistance device

With reference to FIG. 5, a flow of an automatic parking process performed by the parking assistance device according to the second embodiment will be described. FIG. 5 is a flowchart, similar to FIG. 3, schematically illustrating a flow of an automatic parking process performed by the parking assistance device. The illustrated automatic parking process is executed by the processor 33 of the ECU 30. Steps S31-S33, S38 and S39 in FIG. 5 are the same as steps S11-S13, S20 and S21 in FIG. 3, respectively, and therefore expiations thereof will be omitted.

When it is determined that the parking start switch is pressed in step S33 as shown in FIG. 5, the automatic parking unit 332 creates an operation plan until the target parking mode is reached as in step S19 of FIG. 3 (step S34). In particular, in the present embodiment, since the operation mode is not set in advance, the operation plan is created independently of the operation mode.

When the driving plan is created in step S34, the prediction unit 334 calculates a minimum value (minimum distance D) of a distance between the vehicle 1 and an obstacle around the vehicle 1 when the vehicle 1 is automatically driven along the driving plan. Specifically, the prediction unit 334 calculates the minimum value of the distance between the position of the vehicle 1 and the surrounding obstacle at each time point when the vehicle 1 is automatically driven in accordance with the driving plan. Then, the prediction unit 334 calculates, as the minimum distance D, the smallest value among the minimum values at all time points until the vehicle 1 reaches the target parking mode.

When the minimum distance D is calculated in step S35, the prediction unit 334 determines whether or not the calculated minimum distance D is equal to or less than a predetermined reference distance D (step S36). The reference distance D may be a predetermined constant distance, or may be a distance that varies according to a target parking mode or the like.

If it is determined in step S36 that the smallest distance D is equal to or less than the reference distance Dref, the notification unit 335 causes the output device 142 to notify the occupant that the distance from the obstacle may be close during parking as in step S18 of FIG. 3 (step S37). On the other hand, when it is determined in step S36 that the smallest distance D is larger than the reference distance Dref, the notification unit 335 does not cause the output device 142 to perform such notification.

While preferred embodiments according to the present disclosure have been described above, the present disclosure is not limited to these embodiments, and various modifications and changes can be made within the scope of the claims.

The invention claimed is:

1. A parking assistance device, comprising a processor, wherein the processor is configured to:

predict whether or not a distance to an obstacle around a vehicle becomes less than or equal to a reference distance while the vehicle is automatically parked;

perform a notification indicating that the distance to the obstacle may be close during parking to an occupant, when the distance to the obstacle is predicted to be equal to or less than the reference distance;

automatically drive the vehicle until reaching a target parking mode by any of a narrow mode in which the distance to the obstacle when the vehicle is automatically parked is equal to or less than the reference distance and a normal mode in which the distance to the obstacle when the vehicle is automatically parked is not less than the reference distance;

when automatically driving the vehicle in the normal mode, a brake is automatically activated to prevent collision when the distance to the obstacle is equal to or less than the reference distance; and when automatically driving the vehicle in the narrow mode, the brake is not automatically activated to prevent collision when the distance to the obstacle is equal to or less than the reference distance unless the distance to the obstacle is equal to or less than a predetermined distance shorter than the reference distance.

2. The parking assistance device according to claim 1, wherein the processor is configured to predict that, when an in-between clearance in a target parking space is equal to or less than a predetermined reference clearance, the distance to an obstacle around the vehicle becomes equal to or less than the reference distance while the vehicle is automatically parked.

3. The parking assistance device according to claim 1, wherein the processor is configured to automatically drive the vehicle in the narrow mode until the vehicle reaches the target parking mode when an in-between clearance in the target parking space is equal to or less than a predetermined reference clearance, and automatically drives the vehicle in the normal mode until the vehicle reaches the target parking mode when the in-between clearance is larger than the reference clearance.

4. A non-transitory recording medium having recorded thereon a computer program for parking assistance, the computer program causing a computer to execute a process comprising:

predicting whether a distance to an obstacle around a vehicle will be less than or equal to a reference distance while the vehicle is automatically parked;

when it is predicted that the distance to the obstacle is equal to or smaller than the reference distance, performing a notification indicating that the distance to the obstacle may be close during parking to an occupant;

automatically driving the vehicle until reaching a target parking mode by any of a narrow mode in which the distance to the obstacle when the vehicle is automatically parked is equal to or less than the reference distance and a normal mode in which the distance to the obstacle when the vehicle is automatically parked is not less than the reference distance;

when automatically driving the vehicle in the normal mode, automatically activating a brake to prevent collision when the distance to the obstacle is equal to or less than the reference distance; and when automatically driving the vehicle in the narrow mode, the brake is not automatically activated to prevent collision when the distance to the obstacle is equal to or less than the reference distance unless the distance to the obstacle is equal to or less than a predetermined distance shorter than the reference distance.

* * * * *